(12) United States Patent
Oohata et al.

(10) Patent No.: US 7,848,083 B2
(45) Date of Patent: Dec. 7, 2010

(54) SOLID ELECTROLYTIC CAPACITOR AND METHOD FOR MANUFACTURING SAME

(75) Inventors: Hideki Oohata, Tokyo (JP); Yoshihiro Saida, Tokyo (JP); Masayuki Shinoda, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 389 days.

(21) Appl. No.: 11/993,627

(22) PCT Filed: Jun. 22, 2006

(86) PCT No.: PCT/JP2006/312506

§ 371 (c)(1),
(2), (4) Date: Dec. 21, 2007

(87) PCT Pub. No.: WO2006/137482

PCT Pub. Date: Dec. 28, 2006

(65) Prior Publication Data

US 2010/0039751 A1     Feb. 18, 2010

Related U.S. Application Data

(60) Provisional application No. 60/696,537, filed on Jul. 6, 2005.

(30) Foreign Application Priority Data

Jun. 23, 2005     (JP) ............................. 2005-183664

(51) Int. Cl.
*H01G 9/04* (2006.01)
*H01G 9/145* (2006.01)

(52) U.S. Cl. .................. 361/528; 361/532; 29/25.03
(58) Field of Classification Search ......... 361/528–529, 361/532; 29/25.03
See application file for complete search history.

(56) References Cited

U.S. PATENT DOCUMENTS

| 5,530,139 | A |   | 6/1996 | Saida et al. |
| 5,818,687 | A | * | 10/1998 | Shimojima .................. 361/528 |
| 6,320,742 | B1 |   | 11/2001 | Wada et al. |
| 6,719,813 | B2 |   | 4/2004 | Kojima et al. |
| 2003/0007311 | A1 |   | 1/2003 | Kojima et al. |

FOREIGN PATENT DOCUMENTS

CN     1396609 A     2/2003

(Continued)

OTHER PUBLICATIONS

Richerzhagen, Industrial Applications of the Water-Jet Guided Laser, Sep. 2002, Lasers in Manufacturing, Issue 28, pp. 28-30.*

*Primary Examiner*—Eric Thomas
(74) *Attorney, Agent, or Firm*—Sughrue Mion, PLLC

(57) ABSTRACT

The invention relates to a substrate for solid electrolytic capacitor and a method for producing solid electrolytic capacitors using the substrate. By reducing at least part of the porous layer on the surface between the anode part region and the cathode part region of the substrate and preferably filling the dent generated by the reduction with a masking material, a structure ensuring insulation between the anode and the cathode can be obtained and solid electrolytic capacitors excellent in leakage current property and reliability can be obtained.

16 Claims, 2 Drawing Sheets

FOREIGN PATENT DOCUMENTS

| | | |
|---|---|---|
| EP | 1 193 727 A1 | 4/2002 |
| JP | 5-47611 A | 2/1993 |
| JP | 5-166681 A | 7/1993 |
| JP | 11-80596 A | 3/1999 |
| JP | 2000-243665 A | 9/2000 |
| JP | 2002-359162 A | 12/2002 |

* cited by examiner

[Fig. 1]
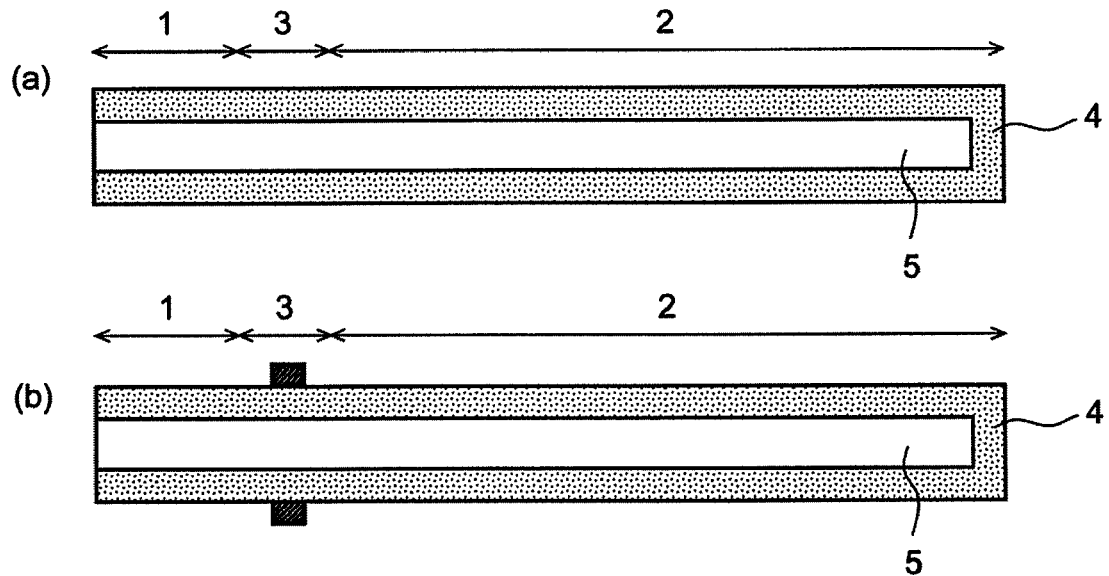
[Fig. 2]
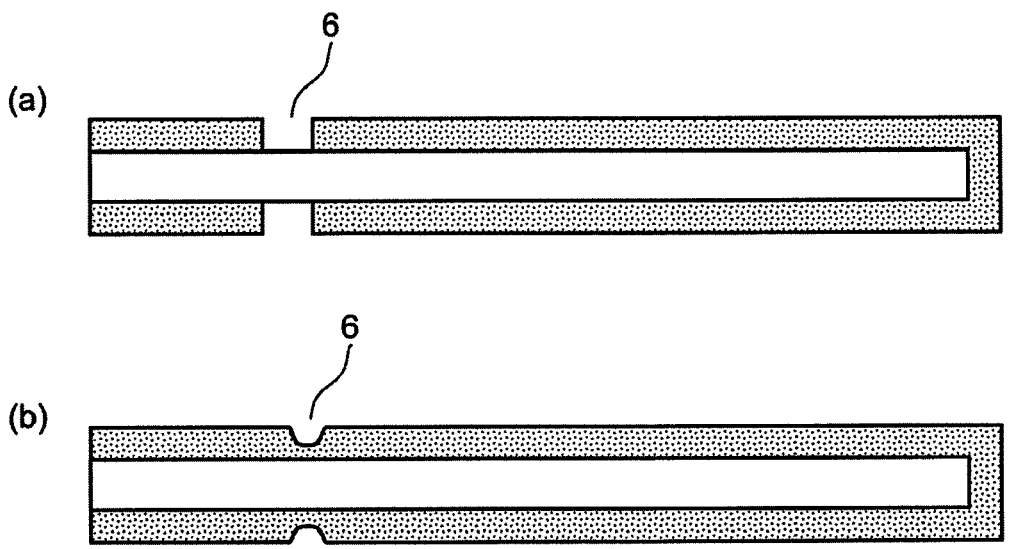
[Fig. 3]
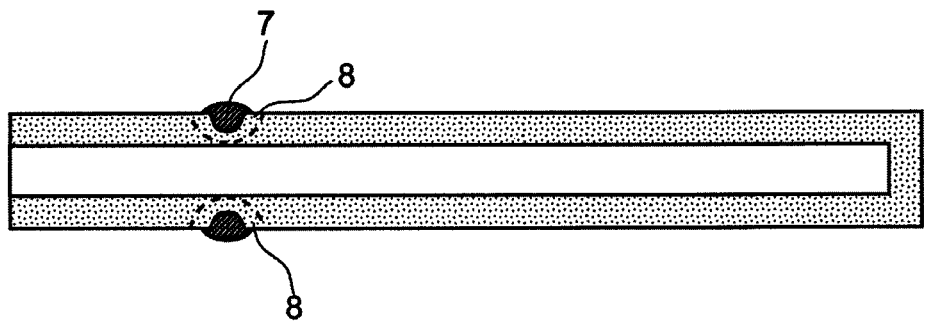

[Fig. 4]
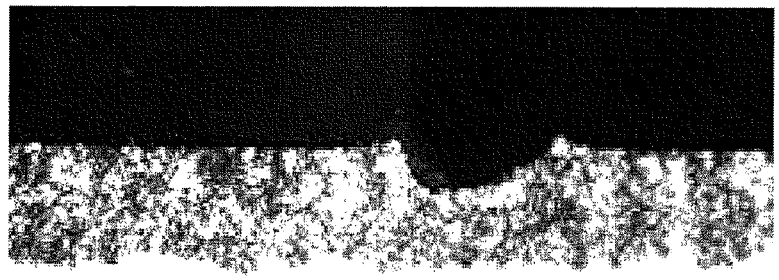
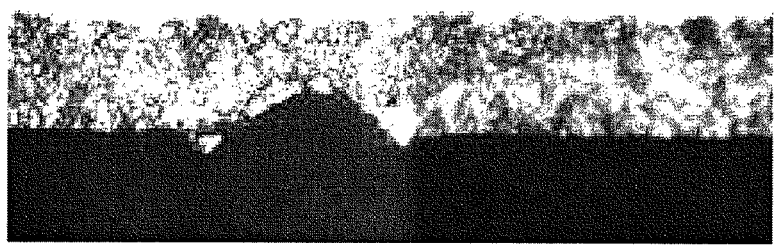
[Fig. 5]
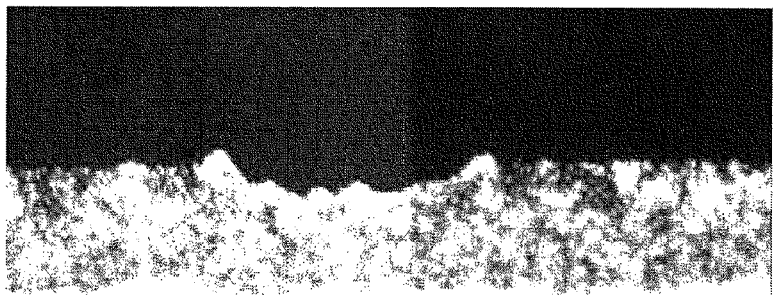
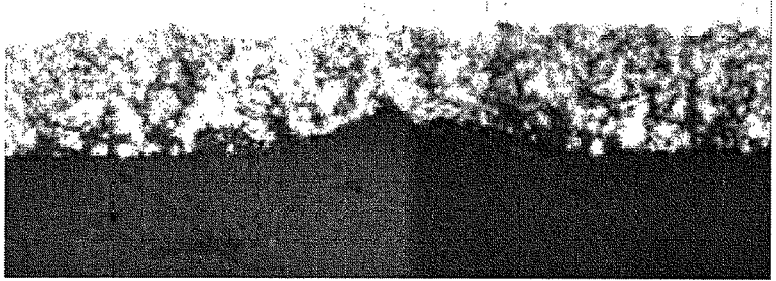
[Fig. 6]
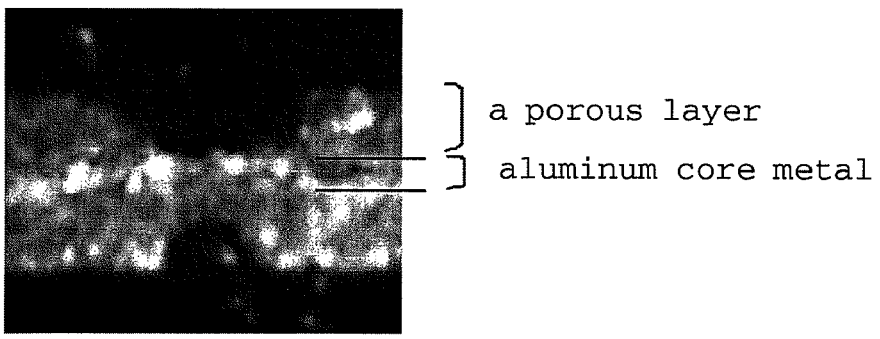

SOLID ELECTROLYTIC CAPACITOR AND METHOD FOR MANUFACTURING SAME

CROSS-REFERENCE TO RELATED APPLICATIONS

This is an application filed pursuant to 35 U.S.C. Section 111(a) with claiming the benefit of U.S. provisional application Ser. No. 60/696,537 filed Jul. 6, 2005 under the provision of 35 U.S.C. 111(b), pursuant to 35 U.S.C. Section 119(e)(1).

TECHNICAL FIELD

The present invention relates to a solid electrolytic capacitor and production method thereof. More specifically, the invention relates to a substrate for solid electrolytic capacitor comprising a shielding structure where insulation between the anode part and the cathode part is ensured, a solid electrolytic capacitor using the substrate and production method thereof.

BACKGROUND ART

Generally, a solid electrolytic capacitor is obtained by subjecting surface of an anode body of valve-action metal such as aluminium, tantalum, niobium, titanium or alloys of these metals to make it rough with micropores on the micron order formed thereon to thereby increase the surface area, forming a dielectric oxide film through chemical formation, impregnating a solid electrolyte via a separator between the film and the anode part or forming a solid electrolyte layer therebetween, forming a cathode electroconductive layer from carbon paste and a metal-containing electroconductive paste thereon, welding the body to a lead frame which serves as an external electrode and then forming an outer casing of epoxy resin or the like.

Particularly, since solid electrolytic capacitors using as solid electrolyte electroconductive polymers can have reduced equivalent series resistance and leakage current as compared with solid electrolytic capacitors using manganese dioxide as solid electrolyte, they are useful as capacitors meeting demands for higher performance and downsizing of electronic devices and many production methods have been proposed.

When a high-performance solid electrolytic capacitor is produced by using an electroconductive polymer, particularly in case of using a valve-action metal foil, it is indispensable to ensure electrical insulation between anode part serving as anode terminal and cathode part consisting of electroconductive layer containing electroconductive polymer. However, in a step of impregnating or forming solid electrolyte, it sometimes occurs that solid electrolyte intrudes into the anode region, so-called "crawling-up". In such a case, insulation failure is caused between the anode part and the cathode part.

Examples of shielding measure for insulating the anode part of solid electrolytic capacitor from the cathode part include a method where after a polyamic acid film is formed by allowing a solution containing polyamic acid salt to electrodeposit on at least one part of valve-action metal having no solid electrolyte formed thereon, a polyimide film is formed by dehydration and curing with heat on the part (Japanese Patent Application Laid-Open No. H05-47611), a method where for the purpose of preventing crawling-up of solid electrolyte, a tape or a resin-coating film of polypropylene, polyester, silicone resin or fluorine resin is formed (Japanese Patent Application Laid-Open No. H05-166681) and a method including a coating step of a masking material solution which infiltrates into a dielectric film and forms a masking layer on the infiltrated part (International Publication No. WO00/67267 pamphlet (EP 1193727)

In the method of forming a polyimide film through electrodeposition (Japanese Patent Application Laid-Open No. H05-47611), it is advantageous as compared with general coating methods in that the film can be formed even on the fine pores, however, the method including electrodeposition step requires high cost and further, dehydration step at a high temperature is required to form a polyimide film. In the method of using a tape or coating film made of insulative resin for the purpose of preventing crawling-up of solid electrolyte in production process (Japanese Patent Application Laid-Open No. H05-166681), it is difficult to cover the edge parts of the substrate with the tape (film) completely, and sometimes solid electrolyte intrudes into the anode part. In production method of solid electrolyte including a coating step of a masking material solution which infiltrates into a dielectric film and forms a masking layer on the infiltrated part (International Publication No. WO00/67267 pamphlet), the coating solution cannot infiltrate deep enough when the surface condition of the dielectric film or formation condition of the fine pores such as pore size distribution is not suitable for the infiltration.

As described above, none of conventional masking methods is satisfactory. There have been demands for masking type (structure) which can ensure insulation between the anode part and the cathode part in a solid electrolytic capacitor.

Patent Document 1: Japanese Patent Application Laid-Open No. H05-47611

Patent Document 2: Japanese Patent Application Laid-Open No. H05-166681

Patent Document 3: International Publication No. WO00/67267 pamphlet

DISCLOSURE OF INVENTION

Problems to be Solved by Invention

Accordingly, the object in the present invention is, by solving the above problems in conventional technique and for the purpose of stabilize quality of solid electrolytic capacitors and enhancing productivity, to provide a base material for solid electrolytic capacitor (in the present Specification and Claims, referred to as "substrate for solid electrolytic capacitor") which can ensure insulation between the anode part region and the cathode part region and production method thereof.

Means for Solving Problems

With a view to solving the above problems, the present inventors have made intensive studies and as a result, they have found out that in a substrate for solid electrolytic capacitor having a porous layer on the surface, by reducing at least part of the porous layer between the anode part region and the cathode part region and preferably filling the dent generated by the reduction with a masking material, a structure ensuring insulation between the anode and the cathode can be obtained to enhance various properties of the obtained capacitor, and thus completed the invention.

That is, according to the present invention, a substrate for solid electrolytic capacitor, a solid electrolytic capacitor and production method thereof as follows can be provided.

1. A substrate for solid electrolytic capacitor comprising a porous layer on the surface, in which at least one part of the porous layer between the anode part region and the cathode part region is reduced.
2. The substrate for solid electrolytic capacitor according to 1, wherein the thickness of the reduced at least part of the porous layer is within a range of 0 to 0.95 based on the thickness of the non-reduced part of the porous layer as 1.
3. The substrate for solid electrolytic capacitor according to 1 or 2, wherein the width of the reduced at least part of the porous layer is within a range of 0.0005 to 0.1 based on the length of the cathode region in the longitudinal direction as 1.
4. The substrate for solid electrolytic capacitor according to any one of 1 to 3, wherein a dent formed in the reduced at least part of the porous layer is filled with a masking material.
5. The substrate for solid electrolytic capacitor according to 4, wherein the masking material is a heat-resistant resin.
6. The substrate for solid electrolytic capacitor according to any one of 1 to 5, which substrate consists of a valve-action metal material.
7. The substrate for solid electrolytic capacitor according to 6, wherein the valve-action metal material includes at least one selected from the group consisting of aluminium, tantalum, niobium, titanium and zirconium.
8. The substrate for solid electrolytic capacitor according to any one of 1 to 7, further comprising a dielectric film formed on the surface.
9. The substrate for solid electrolytic capacitor according to any one of 1 to 8, wherein the substrate has a form of flat plate and the porous layer between the anode part region and the cathode part region is reduced on both surfaces.
10. The substrate for solid electrolytic capacitor according to any one of 1 to 8, wherein the substrate has a form of flat plate and the porous layer between the anode part region and the cathode part region is reduced across around the substrate.
11. A solid electrolytic capacitor, using the substrate for solid electrolytic capacitor according to any one of 1 to 10.
12. A solid electrolytic capacitor element, using the substrate for solid electrolytic capacitor according to any one of 1 to 10.
13. A production method of solid electrolytic capacitor, comprising a step of reducing at least part of a porous layer between the anode part region and the cathode part region in a substrate for solid electrolytic capacitor.
14. The production method of solid electrolytic capacitor according to 13, wherein the reduction step is conducted by removing the porous layer.
15. The production method of solid electrolytic capacitor according to 13, wherein the reduction step is conducted by compressing the porous layer.
16. The production method of solid electrolytic capacitor according to any one of 13 to 15, wherein the step of reducing at least part of a porous layer between the anode part region and the cathode part region in a substrate for solid electrolytic capacitor includes laser irradiation.
17. The production method of solid electrolytic capacitor according to any one of 13 to 16, wherein irradiation of laser beam contained in a water-flow column is included.
18. The production method of solid electrolytic capacitor according to 16 or 17, wherein the laser beam has a wavelength of 0.1 to 11 μm.

Effect of Invention

According to preferred embodiments in the present invention, in a substrate for solid electrolytic capacitor having a porous layer on the surface, by removing or compressing at least part of the porous layer between the anode part region and the cathode part region, preferably by removing it to create dent and filling the dent portion with a masking material, crawling-up of solid electrolyte or a solution of forming solid electrolyte can be prevented in the production process of capacitors to thereby enhance reliability of insulation between the cathode part and anode part and prevent deterioration in leakage current characteristic due to insulation failure, whereby contributing to improvements in production yield and reliability.

BEST MODE FOR CARRYING OUT INVENTION

Hereinafter, the substrate for solid electrolytic capacitor, the capacitor using the substrate and production method thereof in preferred embodiments in the present invention are explained by referring to drawings attached hereto.

The substrate for solid electrolytic capacitor in preferred embodiments in the present invention is a material for capacitor having a porous layer on the surface, preferably, a valve-action metal material having micropores, and particularly preferably a valve-action metal material having a dielectric oxide film on the surface. The valve-action metal is a metal foil of aluminium, tantalum, niobium, titanium, zirconium or alloys consisting of these metals as base metals, a metal bar, or a sintered body containing these metals as its main component. These metals have dielectric oxide films as a result of surface oxidation by oxygen present in the air. By using a known method, the surface is subjected to etching treatment in advance to thereby make the surface porous. Next, it is preferable that a dielectric oxide film be formed by chemical formation according to a known method, for sure.

It is preferable that the valve-action metal substrate having the surface roughened be used after cut out into a desired size for the solid electrolytic capacitor.

As a valve-action metal, although the thickness depends on intended uses, generally, those having a thickness of about 40 to 150 μm are employed. Also, although the size and shape of the valve-action metal foil depend on intended uses, generally, preferred are rectangular foils of about 1 to 50 mm in width and 1 to 50 mm in length as a flat-plate element unit, more preferred are those of 2 to 20 mm in width and 2 to 20 mm in length, particularly preferred are 2 to 5 mm in width and 2 to 6 mm in length.

The present invention is characterized in that the porous layer on the surface of the substrate for solid electrolytic capacitor as described above is reduced at least partially between the anode part region and the cathode part region.

That is, in a substrate for solid electrolytic capacitor having a porous layer on the surface, for example, in a substrate having a dielectric film formed on the surface of a valve-action metal material having micropores, the porous layer in an area between a region for forming an anode (anode part region) and a region for forming a cathode (cathode part region), generally in the boundary area therebetween, is reduced at least in part.

Reduction of the porous layer includes not only removal of the porous layer itself from the substrate but also decreasing the number of fine pores to the minimum on the area to thereby prevent crawling-up of the treatment liquid. For example, reduction steps may include partial melting of porous layer and other densification methods as well as removal of porous layer and compression of porous layer.

There is no limitation on the shape of the substrate for solid electrolytic capacitor substrate. For example, in an etched aluminium foil for plate-type element unit whose sectional view is shown in FIG. 1, this type of etched aluminium foil, commercially available, has a core material 5 (aluminium) in the core of the foil and on both surfaces of the core are etched porous layers 4. Generally, in a case where this is used as a substrate for solid electrolytic capacitor, the region in the vicinity of one end is used as anode part region 1, and the opposite region is used as cathode part region 2 (FIG. 1(a)). The intervening region 3 between the two regions is boundary region 3 separating the anode part region 1 from cathode part region 2. Conventionally, on this region 3, masking material 7 is applied (FIG. 1(b)).

In the present invention, in at least a part of this region, the porous layer is reduced. For example, as shown in FIG. 2, removal or compression is conducted in the boundary region 3. In a case where the porous layer is reduced in this way, the thickness of the porous layer is reduced to thereby create dent 6. As a result, in a case where treatment of forming solid electrolyte is applied in cathode part region 2, solid electrolyte is prevented from crawling up into anode part region 1.

Particularly, as shown in FIG. 3, in a case where dent 6 is filled with masking material 7 (shielding material electrically insulating between the cathode part region and the anode part region to thereby prevent solid electrolyte or a treatment liquid for forming solid electrolyte from intruding from the cathode part region into the anode part region), the shielding layer of masking material 7 is formed deep in the substrate as well as in infiltrated part 8 inside the porous layer. In a case where compression treatment is conducted, since the porous layer remaining after compression is densified, prevention of the phenomenon that solid electrolyte or a treatment liquid for forming solid electrolyte infiltrates to crawl up from the cathode part region to the anode part region is ensured.

Any method of removing porous layer may be employed as far as the porous layer can be removed precisely and the method does not adversely affect other regions, especially, the cathode part. For example, mechanical approach, electrical approach, chemical approach (such as dissolution), thermal approach (such as volatilization) and the like can be used. Preferred examples of the method include cutting using laser beam, cutting using laser beam contained in a water-flow column, scraping-off using a needle-like metal piece and sanding by rotating a disk-shaped metal plate.

In a cutting method using laser beam, laser beam having a wavelength of 0.1 to 11 µm can be used. Specific examples include solid-state lasers such as ruby, glass and YAG, semiconductor lasers such as GaAs and InGaAsP, liquid lasers such as dye lasers, and gas lasers such as He—Ne, Ar, ArF, $F_2$ and $CO_2$. Particularly preferred are a cutting method using laser beam of YAG or $CO_2$ and a cutting method using YAG laser beam contained in a water-flow column.

For example, cutting is carried out by allowing water to be ejected like fine threads from a column having a diameter of 30 to 180 µm under a water pressure of 10 to 50 MPa and introducing YAG laser into the water. In case of using the YAG laser beam contained in the water-flow column, heat generated on laser-irradiated part can be eliminated with the water flow at the same time of irradiation. Therefore, the method is effective in that dissolution of the surface of the porous layer remaining on the substrate can be reduced, which leads to improvement in permeation of masking material and prevention of stains and burrs caused by powder generated by the dissolution.

In case of using the YAG laser beam contained in the water-flow column, the width of the cut area is increased to 1 to 3 times the column diameter due to joint effects of water flow's pressure and laser.

Any method of compressing porous layer may be employed as far as the porous layer can be compressed precisely and the method does not adversely affect other regions, especially, the cathode part. For example, mechanical approach can be employed. More specifically, method where the porous layer is compressed by pressing a needle-like metal piece or an edge part of a thin metal piece against the layer or by pressing a disk-shaped metal plate against the layer while rotating the plate can be employed. However, the present invention is not limited thereto.

The preferred ratio of the dent formed by reducing the porous layer is within a range of from 0 to 0.95 in terms of the porous layer thickness having reduced, based on the complete thickness of the porous layer (the thickness of the non-reduced portion of the porous layer) as 1. For example, when a porous layer having a thickness of 35 µm is present symmetrically on both surfaces of a foil having a thickness of 110 µm, if difference in porous layer thickness between the reduced portion and non-reduced portion is less than 1.75 µm, (total depth of less than 3.5 µm including the front and rear surfaces), the ratio exceeds 0.95, which results in decreasing effects in the present invention. More preferred range is 0.05 to 0.90 in terms of the porous layer thickness having reduced, based on the complete thickness of the porous layer as 1, still more preferably 0.2 to 0.8.

It is also possible to remove all the porous layer from the target part (FIG. 2(a)). In such a case, strength of the substrate is relatively decreased, which adversely affects subsequent processing steps. Accordingly, it is preferable that removal of the porous layer be conducted without affecting subsequent steps (FIG. 2(b)).

The width of the porous layer to be reduced is represented by a ratio from 0.0005 to 0.1 based on the length of the cathode part region in the longitudinal direction as 1. For example, when the length of the cathode part region in the longitudinal direction is 5 mm, the length of the reduced portion in the longitudinal direction falls within a range of 2.5 to 500 µm. Preferred range of the ratio is from 0.001 to 0.075, more preferred is from 0.002 to 0.05. If the ratio of the reduced portion against the length of the longitudinal direction of the cathode part region is less than 0.001, it is difficult for masking material to permeate in the portion, which decreases the shielding effect of electrical insulation between the cathode part region and the anode part region by preventing solid electrolyte or a treatment solution for forming solid electrolyte from intrude from the cathode part region into the anode part region. In contrast, if the ratio exceeds 0.1, it unignorably affects the essential characteristic of a capacitor, capacitance, generating a need for increase in the area of the substrate to obtain a desired capacitance. In consideration for the object in the present invention, in a case where the substrate for solid electrolytic capacitor is a flat plate, it is preferable that the porous layers present between the anode part region and the cathode part region be removed from or compressed on both surfaces of the substrate or circumferentially across the substrate in a belt-like manner.

Chemical formation treatment of valve-action metal cut into a predetermined shape can be conducted by various kinds of methods. There are no particular limitations on conditions for chemical formation. For example, the metal can be chemically formed by using an electrolytic solution at least one selected from the group consisting of oxalic acid, adipic acid, boric acid and phosphoric acid, under conditions that the concentration of the electrolytic solution is from 0.05 to 20 mass %, that the temperature is 0 to 90° C., that current density is 0.1 to 200 mA/cm$^2$, that voltage is set to a value depending on the formation voltage of a film already formed on the chemically formed foil and that the chemical formation time is within 60 minutes. More preferably, the chemical formation is carried out under selected conditions of the concentration of the electrolytic solution of 0.1 to 15 mass %, the temperature of 20 to 70° C., the current density of 1 to 100 mA/cm$^2$ and the chemical formation time within 30 minutes.

The above conditions for chemical formation are preferable in industrial scale method. However, as long as dielectric oxide film formed on the surface of valve-action metal material is not destroyed or deteriorated, conditions such as kind and concentration of electrolytic solution, the temperature, current density and chemical formation time may be arbitrarily selected.

Masking material 7 (FIG. 3) is provided for the purpose of electrically insulating between the cathode part region and the anode part region by allowing the masking material to serve as shielding material preventing solid electrolyte or a treatment liquid for forming solid electrolyte from intruding from the cathode part region into the anode part region.

There are no particular limitations on the masking material (shielding material) as long as the material can meet the above purpose. General heat-resistant resins, preferably heat-resistant resin or precursor thereof soluble or swellable in solvent, composition consisting of inorganic fine powder and cellulose resin (described in Japanese Patent Application Laid-Open No. 11-80596) and the like can be used as the material. Specific examples thereof include polyphenylsulfone (PPS), polyethersulfone (PES), cyanate ester resin, fluorine resin (tetrafluoroethylene, tetrafluoroethylene-perfluoroalkylvinylether copolymer), polyimide and derivatives thereof. Preferred are polyimide, polyethersulfone, fluorine resin and precursors thereof. Particularly preferred is polyimide, having good insulating property with sufficient adhesion to and fillability in valve-action metal, and resistance against high-temperature treatment of up to approximately 450° C. As polyimide, those curable by heat treatment at a low temperature of 200° C. or lower, preferably at a temperature from 100 to 200° C., which is less affected by outer impacts, i.e., less likely to be damaged or destroyed by heat of dielectric layer on the surface of the anode foil, can be preferably employed.

A preferred range of average molecular weight of polyimide is from about 1000 to 1000000, more preferred is from about 2000 to 200000.

These can be dissolved or dispersed in organic solvent and a solution or dispersion thereof can be easily and arbitrarily adjusted to have a solid concentration (i.e. viscosity) suitable for conducting coating operation. Preferred concentration range is from about 10 to 60 mass %, more preferred is from 15 to 40 mass %. If the concentration is too low, the line formed by the masking material (shielding material) blurs. If the concentration is too high, the masking material gets sticky to cause the width of the formed line to fluctuate.

Specific examples of polyimide solution include a solution prepared by dissolving a low-molecular polyimide curable by heat treatment after coating in a solvent having little hygroscopicity such as 2-methoxyethyl ether or triethyleneglycol dimethylether (e.g., available in the market as UPICOAT TMFS-100L, product of UBE INDUSTRIES) and a solution obtained by dissolving a polyimide resin represented by formula (5) in NMP (N-methyl-2-pyrrolidone) or DMAc (dimethyl acetamide) (e.g., available in the market as RIKACOAT-TM, product of New Japan Chemical co., ltd.).

In a preferred embodiment in the present invention, a shielding material layer is formed by applying the liquid masking material as described above on the reduced porous layer. By using a masking material in a liquid state, the reduced portion in the porous layer is assuredly filled with the masking material. If necessary, the shielding material layer formed from the masking material (shielding material) solution may be subjected to treatments such as drying, heating and light irradiation after the coating of the solution.

In the present invention, by using the above-described substrate for solid electrolytic capacitor and forming solid electrolyte on the cathode part region, a solid electrolytic capacitor excellent in insulation between the anode part and the cathode part can be obtained.

Examples of solid electrolyte include electroconductive polymers comprising as repeating unit a structure represented by a compound having a thiophene skeleton, a compound having a polycyclic sulfide skeleton, a compound having a pyrrole skeleton, a compound having a furan skeleton or a compound having an aniline skeleton. However, the electroconductive polymer for forming the solid electrolyte is not limited to these examples.

Examples of compound having a thiophene skeleton include derivatives of 3-methyl thiophene, 3-ethyl thiophene, 3-propyl thiophene, 3-butyl thiophene, 3-pentyl thiophene, 3-hexyl thiophene, 3-heptyl thiophene, 3-octyl thiophene, 3-nonyl thiophene, 3-decyl thiophene, 3-fluoro thiophene, 3-chloro thiophene, 3-bromothiophene, 3-cyanothiophene, 3,4-dimethyl thiophene, 3,4-diethyl thiophene, 3,4-butylene thiophene, 3,4-methylene dioxythiophene and 3,4-ethylene dioxythiophene. These compounds can be obtained as commercially available products or prepared by known methods (e.g., see Synthetic Metals, 1986, Vol. 15, Page 169). However, the present invention is not limited thereto.

Examples of compound having a polycyclic sulfide skeleton usable here include a compound having 1,3-dihydro polycyclic sulfide (also called 1,3-dihydrobenzo [c] thiophene) skeleton and a compound having a 1,3-dihydronaphtho [2,3-c] thiophene skeleton. Further, examples include a compound having a 1,3-dihydroanthra[2,3-c] thiophene skeleton, and a compound having a 1,3-dihydronaphthaceno[2,3-c] thiophene skeleton. They can be prepared by known methods, such as the method described in Japanese Patent Application Laid-Open No. 8-3156(U.S. Pat. No. 5,530,139).

Furthermore, usable examples include a compound having a 1,3-dihydronaphtho[1,2-c] thiophene skeleton, a 1,3-dihydro phenanthra[2,3-c] thiophene derivative, a compound having a 1,3-dihydrotriphenylo[2,3-c] thiophene skeleton, and a 1,3-dihydrobenzo[a]anthraceno[7,8-c] thiophene derivative.

In some cases, nitrogen or N-oxide is arbitrarily contained in a condensed ring. Examples thereof include 1,3-dihydrothieno[3,4-b]quinoxaline, 1,3-dihydrothieno[3,4-b]quinoxaline-4-oxide and 1,3-dihydrothieno[3,4-b] quinoxaline-4,9-dooxide. However, the invention is not limited thereto.

Examples of compound having a pyrrole skeleton include derivatives of 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylene dioxypyrrole and 3,4-ethylene dioxypyrrole. These compounds can be obtained as commercially available products or prepared by known methods. However, the present invention is not limited thereto.

Examples of compound having a furan skeleton include derivatives of 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds can be obtained as commercially available products or prepared by known methods. However, the present invention is not limited thereto.

Examples of compound having an aniline skeleton include derivatives of 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethyl aniline, 3,4-butylene aniline, 3,4-methylene dioxyaniline and 3,4-ethylene dioxyaniline. These compounds can be obtained as commercially available products or prepared by known methods. However, the present invention is not limited thereto.

Also, combination of compounds selected from above compound groups may be used as ternary copolymer. In such a case, the composition ratio between the polymerizable monomers and the like depend on polymerization conditions and preferable composition and polymerization ratio can be confirmed by carrying out simple tests.

In the present invention, any oxidant which can cause oxidation as dehydrogenative 4-electron oxidation reaction satisfactorily can be used in production of electroconductive polymer used as solid electrolyte. Specifically, compounds relatively inexpensive from industrial viewpoint and easy to handle in the production process are includes. Specific examples include Fe(III) compounds such as $FeCl_3$, $FeClO_4$ and Fe(organic acid anion) salt, anhydrous aluminium chloride/cuprous chloride, alkali metal persulfates, ammonium persulfates, peroxides, manganese compounds such as potassium permaganate, quinones such as 2,3-dichloro-5,6-dicyano-1,4-benzoquinone(DDQ), tetrachlorol, 4-benzoquinone and tetracyano-1,4-benzoquinone, halogens such as iodine and bromine, sulfonic acids such as peracid, sulfuric acid, fuming sulfuric acid, sulfur trioxide, chloro sulfuric acid, fluorosulfuric acid and amidosulfonic acid, ozone and combinations of two or more of these oxidants.

Among these, examples of basic compound of an organic acid anion forming the Fe (organic acid anion) salt include organic sulfonic acid, organic carboxylic acid, organic phosphoric acid and organic boric acid. Examples of organic sulfonic acid include benzenesulfonic acid, p-toluene sulfonic acid, methanesulfonic acid, ethanesulfonic acid, α-sulfonaphthalene, β-sulfo-naphthalene, naphthalene disulfonic acid, and alkyl naphthalene sulfonic acid (including as alkyl groups, butyl, triisopropyl, di-t-butyl and the like).

On the other hand, examples of organic carboxylic acid usable here include polymer electrolyte anions of acetic acid, propionic acid, benzoic acid and oxalic acid. Further in the present invention, polyacrylic acid, polymethacrylic acid, polystyrene sulfonic acid, polyvinyl sulfonic acid, polyvinyl sulfuric acid, poly-α-methylsulfonic acid, polyethylene sulfonic acid and polyphosphoric acid. However, these are cited only for purposes of illustration of organic sulfonic acid and organic carboxylic acid and not for limitation. Counter cations of the above anions are $H^+$, alkali metal ions such as, Na and $K^1$ or ammonium ions substituted with tetramethyl group, tetraethyl group, tetrabutyl group or tetraphenyl group. In the present invention, there is no particular limitation on the cations. Particularly referred among the above oxidants are those containing trivalent Fe compounds, cuprous chloride compounds, alkali metal persulfates, ammonium persulfates, manganese compounds or quinones.

In the present invention, examples of counter anion having dopant ability allowed to coexist when necessary in production of electroconductive polymer used as solid electrolyte include electrolytic compounds having oxidant anions (reductant of oxidant) generated from above-described oxidants as counter anions and other anion-based electrolytes. Specific examples include protonic acid anions such as halogenated anions of 5B-Group elements such as $PF_6^-$, $SbF_6^-$ and $AsF_6^-$, halogenated anions of 3B-Group elements such as $BF_4^-$, halogen anions such as $I^-$ ($I_3^-$), $Br^-$ and $Cl^-$, halogen acid anions such as $ClO_4^-$, Lewis acid anions such as $AlCl_4^-$, $FeCl_4^-$ and $SnCl_5^-$, Inorganic acid anions such as $NO_3^-$ and $SO_4^-$, organic sulfonic acid anions such as p-toluene sulfonic acid, naphthalene sulfonic acid, alkyl-substituted sulfonic acid having 1 to 5 carbon atoms, $CH_3SO_3^-$ and $CF_3SO_3^-$, and such as carboxylic acid anions such as $CF_3COO^-$ and $C_6H_5COO^-$. Further, examples include polymer electrolyte anions of polyacrylic acid, polymethacrylic acid, polystyrene sulfonic acid, polyvinyl sulfonic acid, polyvinyl sulfuric acid, poly-α-methyl sulfonic acid, polyethylene sulfonic acid and polyphosphoric acid. However, the present invention is not limited thereto.

However, preferred are high-molecular-weight or low-molecular-weight organic sulfonic acid or polyphosphoric acid. It is desirable that aryl sulfonate dopant be used. For example, salt of benzenesulfonic acid, toluenesulfonic acid, naphthalenesulfonic acid, anthracenesulfonic acid, anthraquinone-sulfonic acid or derivatives of these compounds can be used.

The concentration of monomer forming an electroconductive polymer used as solid electrolyte in the present invention varies depending on the kinds of substituents of the compounds, solvent and the like. Generally, it is preferable that the concentration be within a range of $10^{-3}$ to 10 mol/L, more preferably from $10^{-2}$ to 5 mol/L. The reaction temperature is determined according to reaction method and cannot be flatly defined. Generally, the temperature is selected from the range of −70 to 250° C., preferably −30 to 150° C., more preferably −10 to 30° C.

In the present invention, any reaction solvent that can dissolve monomer, oxidant and counter anion having dopant ability together or separately can be used. Examples thereof include ethers such as tetrahydrofuran, dioxane and diethylether, polar aprotic solvents such as dimethylformamide, acetonitrile, benzonitrile, N-methylpyrrolidone and dimethylsulfoxide, esters such as ethyl acetate and butyl acetate, non-aromatic chlorine-based solvents such as chloroform and methylene chloride, nitro compounds such as nitromethane, nitroethane and nitrobenzene, alcohols such as methanol, ethanol and propanol, organic acids such as formic acid, acetic acid and propionic acid, acid anhydrides of these organic acids (such as acetic anhydride), water, alcohols and ketones and also mixtures of these solvents may be used. Moreover, the oxidant or/and counter anion having dopant ability and monomer can be handled separately dissolved in solvent, that is, in two-liquid system or three-liquid system.

The conductivity of the thus produced solid electrolyte is 1 S/cm or more, preferably 5 S/cm or more, more preferably 10 S/cm or more.

Further, by providing a carbon paste layer and an electroconductive layer containing metal powder on the surface of the solid electrolyte layer, a cathode part of the capacitor is formed. The electroconductive layer containing metal powder is closely adhered onto the solid electrolyte layer to thereby serve as cathode and also serve as layer for attaching a cathode lead terminal to the final capacitor product. The thickness of the electroconductive layer containing metal powder is not limited. Generally the thickness is about from 1 to 100 μm, preferably 5 to 50 μm.

Generally, the substrate for solid electrolytic capacitor according to the present invention is used in a laminate-type capacitor element. In a laminate-type solid electrolytic capacitor element, a lead frame may be processed to have a rotundate shape by chamfering corners, i.e., cutting angles to round them off to some extent. Also, the opposing cathode bonding part can be allowed to play the role of lead terminal.

There are no particular limitations on materials for lead frame as long as the material is widely used one. Preferred examples thereof include copper-base (such as Cu—Ni base, Cu—Ag base, Cu—Su base, Cu—Fe base, Cu—Ni—Ag base, Cu—Ni—Sn base, Cu—Co—P base, Cu—Zn—Mg base and Cu—Sn—Ni—P base alloys) materials and materials having on the surface copper-base plating, in consideration for obtaining good efficiency in chamfering corners of the lead frame.

A solid electrolytic capacitor is obtained by attaching a lead terminal to a lead frame bonded to an anode part, attaching a lead terminal to a cathode part consisting of solid electrolyte layer, carbon paste layer and an electroconductive layer containing metal powder, and then sealing the whole body with an insulating resin such as epoxy resin.

The present invention encompasses capacitors using a substrate for solid electrolytic capacitor having porous layer on the surface. The invention is not limited by the solid electrolyte and structures explained above in detail.

EXAMPLES

The present invention is described in detail below by referring to Examples and Comparative Examples, however, the present invention is not limited to these Examples. Each cutting/compression depth in the following Examples is described in terms of the total depth including both faces of foils.

Example 1

A chemically formed aluminum foil having thickness of 110 μm (having a porous layer having thickness of about 35 μm per face) which has been cut to be 3.5 mm in width is cut so that each piece is 13 mm in length. One of short sides of each piece is fixed to a metal guide by welding. In preparation for chemical formation of cut surfaces, a 0.8 mm-wide line is drawn by using polyimide resin solution (product of UBE INDUSTRIES, LTD.) at a position of 7 mm from the other short side which is not fixed, and is dried at 180° C. for 30 minutes. The part from the edge of the unfixed end of the aluminum foil to the polyimide resin line is immersed in an ammonium adipate solution, a voltage of 3 V is applied thereto to chemically form the cut surfaces which have not been chemically formed and to form a dielectric film thereon.

Next, by using a metal bar having a needle-like protrusion, a part of the foil with the position 5-mm from the edge of the aluminum foil as center of the part is scratched to form a cutting groove 20 μm deep and 40 μm in width (FIG. 4 shows a photograph of a cross-section (magnification: 300) including the cut part). A polyimide resin is applied in 0.8 mm-wide line on the groove with the position 5-mm from the edge of the aluminum foil as center of the line, for the purpose of shielding both anode and cathode parts from each other.

Solid electrolyte is formed in the cathode part region as follows.

That is, the cathode region (3.5 mm×4.6 mm) is immersed in an isopropanol solution (solution 1) containing 20 mass % of 3,4-ethylenedioxythiophene, pulled out and left standing at 25° C. for 5 minutes. Subsequently, after the cathode part is immersed in a solution (solution 2) containing 30 mass % of ammonium persulfate, it is dried at 45° C. for 10 minutes to cause oxidation polymerization. The operation from the step of immersion in solution through the step of immersion in solution 2 for oxidation polymerization is repeated 15 times. Then, the cathode part is washed with hot water at 50° C. for 30 minutes, and dried at 100° C. for 30 minutes. The solid electrolyte layer is formed thereon. Moreover, the electrode is formed on the cathode portion by using carbon paste and silver paste, to thereby complete each capacitor element.

Three capacitor elements are stacked on a lead frame by bonding the part including shielding material layer applied on the cut portion of each of the elements with silver paste. To part without solid electrolyte formed thereon, an anode lead terminal is connected by welding. The whole is encapsulated with epoxy resin and subjected to aging for 3 hours by applying a rated voltage at 135° C. In this way, 30 chip-type capacitors are produced.

Capacitance and loss factor (tan δ) at 120 Hz, equivalent series resistance (hereinafter, referred to as ESR) at 100 kHz and leakage current of these 30 capacitors are measured as initial properties. The leakage current is measured one minute after the rated voltage is applied. These measurement results are as follows.

| Capacitance (an average value) | 98 μF |
|---|---|
| tan δ (an average value) | 1.2% |
| ESR (an average value) | 7 mΩ |
| leakage current (an average value) | 0.15 μA |

Assuming that the capacitor with a leakage current of 1.0 μA (0.005 CV) or more is defective, the defective ratio is 0%.

The results of the reflow test and the subsequent humidity test are shown below. In the reflow test (solder heat resistance test), evaluation is made in the following method. That is, 30 capacitor elements are prepared, the elements are allowed to pass through a temperature of 245° C. for 10 seconds, which is repeated 3 times. The leakage current is measured one minute after the rated voltage is applied and elements with leakage current of 8.0 μA (0.04 CV) or more are categorized as defective. In the humidity test, elements with leakage current of 60 μA (0.3 CV) or more after left standing for 500 hours under high temperature and high humidity of 60° C. at 90 % RH are categorized as defective.

Leakage current after the reflow test: 0.20 μA

Leakage current after the humidity test: 11.7 μA

The defective ratios in both tests are 0.

These results including the results of the other Examples and Comparative Examples are shown in Table 1. In Table 1, "cut/compression ratio (depth)" shows the thickness of the porous layer after removal or compression is conducted, based on the total thickness of the porous layer (the thickness of the porous layer not subjected to removal or compressing) as 1. "Ratio in size (in width)" of the reduced portion" is the width of the removed or compressed porous layer, based on the longitudinal length of the cathode part as 1.

Example 2

Capacitors are produced and evaluated in the same manner as in Example 1 except that cutting grooves formed in the step of reducing the porous layer are 6 μm deep and 4 μm wide.

Example 3

Capacitors are produced and evaluated in the same manner as in Example 1 except that cutting grooves formed in the step of reducing the porous layer are 70 μm deep and 400 μm wide.

Example 4

Capacitors are produced and evaluated in the same manner as in Example 1 except that, instead of a metal bar having a needle-like protrusion, a metal disk having width of 0.1 mm is used and pressed against each foil piece while rolling on it to thereby compress the porous layer on both surfaces and form a groove 20 μm deep and 130 μm wide.

Example 5

Capacitors are produced and evaluated in the same manner as in Example 1 except that cutting grooves formed in the step of reducing the porous layer are 3 μm deep and 1 μm wide.

Example 6

Capacitors are produced and evaluated in the same manner as in Example 1 except that cutting grooves formed in the step of reducing the porous layer are 3 μm deep and 500 μm wide.

Example 7

Capacitors are produced and evaluated in the same manner as in Example 1 except that a laser beam (YAG (ECOM-MARKER; product of MIYACHI, ML-7064A, wave length; 1064 nm) is used to form a cut groove 10 μm deep and 70 μm wide on each foil piece. FIG. 5 (magnification: 300) shows a photograph of the cross-section including the cut portion.

Example 8

Capacitors are produced and evaluated in the same manner as in Example 1 except that a laser beam (YAG (Aqua laser; product of SHIBUYA KOGYO CO., LTD., wave length; 532 nm)) contained in a water-flow column is used to form a cut groove having depth of 65 to 66 μm and width of 55 to 120 μm on each foil piece. FIG. 6 (magnification: 300) shows a photograph of the cross-section including the cut portion.

Comparative Example 1

Capacitors are produced and evaluated in the same manner as in the above Examples except that polyimide resin is applied on each piece of the chemically formed aluminum foil to shield the anode part and the cathode part without previously conducting a step of removing and compressing the porous layer.

TABLE 1

Cut/compression conditions

| | Cut/compression depth [μm] | Cut/compression ratio (depth) | Cut/compression width [μm] | ratio in size of the reduced section (width) |
|---|---|---|---|---|
| EX. 1 | 20 | 0.71 | 40 | 0.0087 |
| EX. 2 | 6 | 0.914 | 4 | 0.00087 |
| EX. 3 | 70 | 0 | 400 | 0.087 |
| EX. 4 | 20 | 0.71 | 130 | 0.028 |
| EX. 5 | 3 | 0.957 | 1 | 0.00043 |
| EX. 6 | 3 | 0.957 | 500 | 0.109 |
| EX. 7 | 20 | 0.71 | 80 | 0.017 |
| EX. 8 | 65-66 | 0.06-0.07 | 55-120 | 0.012-0.026 |
| Comp. EX. 1 | 0 | 1 | 0 | 0 |

TABLE 2

Initial properties of capacitors

| | capacitance [μF] | loss factor [%] | impedance [mΩ] | leakage current [μA] | defective ratio [%] | Number Of short circuits [units] |
|---|---|---|---|---|---|---|
| EX. 1 | 98 | 1.2 | 7 | 0.15 | 0 | 0 |
| EX. 2 | 100 | 1.2 | 9 | 0.11 | 0 | 0 |
| EX. 3 | 95 | 1.1 | 8 | 0.12 | 0 | 0 |
| EX. 4 | 93 | 1.2 | 7 | 0.18 | 0 | 0 |
| EX. 5 | 96 | 1.2 | 7 | 0.31 | 3 | 2 |
| EX. 6 | 98 | 1.1 | 8 | 0.53 | 8 | 3 |
| EX. 7 | 97 | 1.2 | 8 | 0.14 | 0 | 0 |
| EX. 8 | 98 | 1.1 | 8 | 0.11 | 0 | 0 |
| Comp. EX. 1 | 98 | 1.1 | 8 | 0.69 | 10 | 4 |

TABLE 3

Test results of reliability of capacitors

| | Reflow test | | | Humidity Test | | |
|---|---|---|---|---|---|---|
| | leakage current [μA] | Number of defective products | Number of short circuits | leakage current [μA] | Number of defective products | Number of short circuits |
| EX. 1 | 0.20 | 0 | 0 | 11.7 | 0 | 0 |
| EX. 2 | 0.22 | 0 | 0 | 30.7 | 0 | 0 |
| EX. 3 | 0.33 | 0 | 0 | 22.4 | 0 | 0 |
| EX. 4 | 0.35 | 0 | 0 | 26.4 | 0 | 0 |
| EX. 5 | 0.45 | 2 | 2 | 40.6 | 2 | 2 |
| EX. 6 | 0.67 | 3 | 3 | 50.7 | 2 | 2 |
| EX. 7 | 0.27 | 0 | 0 | 27.2 | 0 | 0 |
| EX. 8 | 0.21 | 0 | 0 | 10.9 | 0 | 0 |
| Comp. EX. 1 | 0.79 | 4 | 3 | 55.4 | 3 | 2 |

As shown in the above results, the leakage current is reduced and the ratio of defective products is significantly improved according to the present invention. Especially, the improvement effects of improving are remarkable when the removal/compression of the porous layer is performed in a preferred range (Examples 1 to 4), which confirms the excellent effectiveness of the method in the present invention.

INDUSTRIAL APPLICABILITY

According to the present invention, crawling-up of solid electrolyte or a treatment solution for forming solid electrolyte is prevented to thereby ensure insulation between a cathode part and an anode part by an easy operation of removing at least part of a porous layer between the anode part region and the cathode part region on a substrate for a solid electrolytic capacitor having a porous layer on the surface and then preferably filling the reduced portion which is formed by removing part of the porous layer with a masking material. As a result, deterioration of leakage current due to defective insulation can be prevented and improvement of yield and reliability are attained. Accordingly, the present invention can be widely used for productions of solid electrolytic capacitors whose substrate has a porous layer on the surface.

BRIEF DESCRIPTION OF THE DRAWINGS

FIG. 1 shows a typical view of a cross-section of a substrate for a general solid electrolytic capacitor.

FIG. 2 shows a typical view of a cross-section of a state that part of a porous layer of a substrate for a solid electrolytic capacitor has been removed or compressed according to the present invention.

FIG. 3 shows a typical view of a cross-section a state that the removed portion is filled with a masking material according to the present invention.

FIG. 4 is a photograph showing an example of a cross-section of a substrate (foil) for a solid electrolytic capacitor with a part of a porous layer having been removed according to the present invention (magnification: 300).

FIG. 5 is a photograph showing an example of a cross-section of a substrate (foil) for a solid electrolytic capacitor with a part of a porous layer having been removed according to the present invention (magnification: 300) by using a laser beam according to the present invention (magnification: 300).

FIG. 6 is a photograph showing an example of a cross-section of a substrate (foil) for a solid electrolytic capacitor with a part of a porous layer having been removed according to the present invention (magnification: 300) by using a laser beam contained in a water-flow column according to the present invention (magnification: 150).

EXPLANATION OF REFERENCE NUMBERS 1 anode part region
2 cathode part region
3 boundary
4 porous layer
5 core
6 portion removed or compressed
7 shielding material (masking material)
8 region where shielding material (masking material) has permeated in the porous layer

The invention claimed is:

1. A substrate for solid electrolytic capacitor comprising a porous layer on the surface, in which at least one part of the porous layer between the anode part region and the cathode part region is reduced,
   wherein the width of the reduced at least part of the porous layer is within a range of 0.0005 to 0.1 based on the length of the cathode region in the longitudinal direction as 1; and
   wherein a dent formed in the reduced at least part of the porous layer is filled with a masking material.

2. The substrate for solid electrolytic capacitor according to claim 1, wherein the thickness of the reduced at least part of the porous layer is within a range of 0 to 0.95 based on the thickness of the non-reduced part of the porous layer as 1.

3. The substrate for solid electrolytic capacitor according to clam 1, wherein the masking material is a heat-resistant resin.

4. The substrate for solid electrolytic capacitor according to claim 1, which substrate consists of a valve-action metal material.

5. The substrate for solid electrolytic capacitor according to claim 4, wherein the valve-action metal material includes at least one selected from the group consisting of aluminium, tantalum, niobium, titanium and zirconium.

6. The substrate for solid electrolytic capacitor according to claim 1, further comprising a dielectric film formed on the surface.

7. The substrate for solid electrolytic capacitor according to claim 1, wherein the substrate has a form of flat plate and the porous layer between the anode part region and the cathode part region is reduced on both surfaces.

8. The substrate for solid electrolytic capacitor according to claim 1, wherein the substrate has a form of flat plate and the porous layer between the anode part region and the cathode part region is reduced across around the substrate.

9. A solid electrolytic capacitor, using the substrate for solid electrolytic capacitor according to claim 1.

10. A solid electrolytic capacitor element, using the substrate for solid electrolytic capacitor according to claim 1.

11. A production method of solid electrolytic capacitor, comprising a step of reducing at least part of a porous layer between the anode part region and the cathode part region in a substrate for solid electrolytic capacitor,
    wherein the width of the reduced at least part of the porous layer is within a range of 0.0005 to 0.1 based on the length of the cathode region in the longitudinal direction as 1; and
    wherein a dent formed in the reduced at least part of the porous layer is filled with a masking material.

12. The production method of solid electrolytic capacitor according to claim 11, wherein the reduction step is conducted by removing the porous layer.

13. The production method of solid electrolytic capacitor according to claim 11, wherein the reduction step is conducted by compressing the porous layer.

14. The production method of solid electrolytic capacitor according to claim 11, wherein the step of reducing at least part of a porous layer between the anode part region and the cathode part region in a substrate for solid electrolytic capacitor includes laser irradiation.

15. The production method of solid electrolytic capacitor according to claim 14, wherein the laser beam has a wavelength of 0.1 to 11 μm.

16. The production method of solid electrolytic capacitor according to claim 11, wherein irradiation of laser beam contained in a water-flow column is included.

* * * * *